United States Patent
Chang et al.

(10) Patent No.: US 8,209,118 B2
(45) Date of Patent: Jun. 26, 2012

(54) VEHICLE DISPATCH SYSTEM

(75) Inventors: S. K. Jason Chang, Taipei (TW);
Chi-Hsuan Wu, Kaohsiung (TW);
Guan-Yao Wang, Taipei County (TW);
Jyun-Jhe Hung, Taipei County (TW)

(73) Assignee: National Taiwan University, Taipei (TW)

( * ) Notice: Subject to any disclaimer, the term of this patent is extended or adjusted under 35 U.S.C. 154(b) by 826 days.

(21) Appl. No.: 12/289,543

(22) Filed: Oct. 30, 2008

(65) Prior Publication Data
US 2009/0143965 A1    Jun. 4, 2009

(30) Foreign Application Priority Data
Dec. 3, 2007  (TW) ............................. 96145796 A

(51) Int. Cl.
*G01C 21/00* (2006.01)
(52) U.S. Cl. ............................................ 701/400
(58) Field of Classification Search ................. 701/200, 701/400
See application file for complete search history.

(56) References Cited

U.S. PATENT DOCUMENTS

| | | | |
|---|---|---|---|
| 2002/0055818 A1* | 5/2002 | Gaspard, II | 701/209 |
| 2004/0199415 A1* | 10/2004 | Ho | 705/8 |
| 2007/0073552 A1* | 3/2007 | Hileman | 705/1 |

* cited by examiner

*Primary Examiner* — Mila Airapetian
(74) *Attorney, Agent, or Firm* — Bacon & Thomas, PLLC

(57) ABSTRACT

A vehicle dispatch system includes a plurality of vehicle loading modules and a vehicle controlling server. The vehicle loading modules comprises a first wireless transmitting apparatus, a global positioning receiver for providing current coordinates of the vehicles, and a meter apparatus for transmitting an activating message when transporting a passenger. The vehicle controlling server comprises a geographic information system database apparatus for receiving and storing current coordinates of the vehicles, a plurality of road information, an operating interface platform for providing a user with a network apparatus to connect to the operating interface platform for inputting a calling request, and a second wireless transmitting apparatus for transmitting a request to a specified vehicle.

9 Claims, 6 Drawing Sheets

VEHICLE DISPATCH SYSTEM

FIELD OF THE INVENTION

The present invention relates to a vehicle dispatch system, and more especially to a vehicle dispatch system comprising an operating interface platform, which allows a user to connect to the operating interface platform via a network apparatus for selecting a vehicle dispatch service.

BACKGROUND OF THE INVENTION

The conventional way of vehicle dispatch service is using the way of radio communication or GPS positioning. The conventional vehicle dispatch service is proceeded through a dispatch center to designate a dispatch vehicle manually and/or via a computer system, hence the user can not obtain the related information of the vehicle structure information earlier, such as the manufacturing date, the serial number, or the traffic violation, and etc., so the use has no way to reject the service vehicle which he/her does not want. Therefore, even a user had a bad riding experience, it is not assured that such an unpleasant experience would never happen again by which to deprive a passenger from his/her vehicle selection rights.

SUMMARY OF THE INVENTION

Therefore, the objective of present invention is to provide a vehicle dispatch system which allows the user to obtain the related information with respect to the dispatch vehicle and the driver before the vehicle dispatch service is selected.

As a result, the present invention provides a vehicle dispatch system comprising a plurality of vehicle loading modules, and a vehicle controlling server.

The vehicle loading modules are installed a plurality of the vehicles respectively, and each vehicle loading module comprises a first wireless transmitting apparatus, a global positioning receiver, and a meter apparatus.

The global positioning receiver is for providing the current coordinates of the vehicles, and transmitting the coordinates via the first wireless transmitting apparatus.

The meter apparatus is activated when the vehicles carry passengers, and transmits an activating message via the first wireless transmitting apparatus.

The vehicle controlling server includes a geographic information database apparatus, an operating interface platform, and a second wireless transmitting apparatus.

The geographic information database apparatus receives and stores coordinates of current location of the vehicles and a plurality of road information.

The operating interface platform allows a user to connect to the operating interface platform via a network apparatus for inputting a calling request. The operating interface platform receives the calling request and the activating message, and then selects a specified vehicle based on the current coordinates of the vehicles, the road information, and the calling request.

The second wireless transmitting apparatus transmits a specified request to the specified vehicle.

The advantage of the present invention is that the user can input the calling request to the operating interface platform via the network apparatus, so as to select a specified vehicle based on the current coordinates of the vehicles, the road information, and the calling request.

BRIEF DESCRIPTION OF THE DRAWINGS

The subject matter regarded as the invention is particularly pointed out and distinctly claimed in the concluding portion of the specification. The invention, both as to device and method of operation, together with features and advantages thereof may best be understood by reference to the following detailed description with the accompanying drawings in which:

DETAILED DESCRIPTION OF THE PREFERRED EMBODIMENTS

To make it easier for our examiner to understand the present invention, the following detailed description with reference to the accompanying drawings of embodiments are given for example, but such preferred embodiment is not intended to limit the scope of the present invention. For simplicity, like numerals are used for like elements as described in the specification of the present invention.

Figure 1:
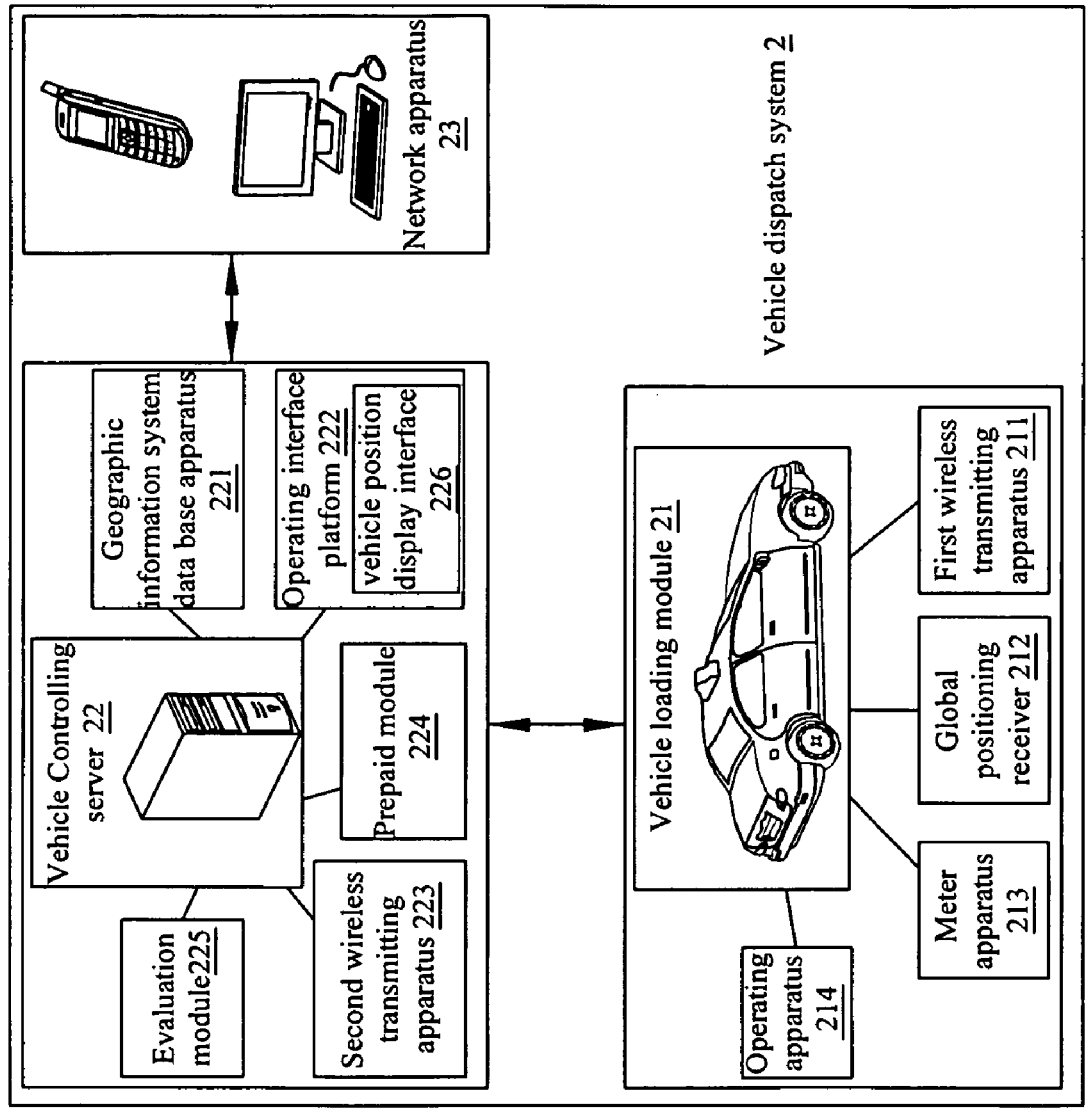
FIG. 1 illustrates a diagram depicting the vehicle dispatch system of the present invention.

The FIG. 1 illustrates the embodiment of the vehicle dispatch system of the present invention. The vehicle dispatch system comprises a plurality of vehicle loading modules 21, a vehicle controlling server 22, and a network apparatus 23.

The vehicle loading modules 21 are installed in a plurality of vehicles respectively, and each vehicle loading modules 21 comprises a first wireless transmitting apparatus 211, a global positioning receiver 212, a meter apparatus 213, and an operating apparatus 214.

Preferably, the first wireless transmitting apparatus 211 can be a communication apparatus implemented by the communication technology of GSM/GPRS, 3 G, 3.5 G, WiFi, WiMax and etc, for receiving message or data.

The global positioning receiver 212 can receive the broadcasting signal from the satellites of global positioning system, and obtain the current coordinates of the vehicles from the broadcasting signal, and transmit the coordinate to remote via first wireless transmitting apparatus.

The meter apparatus 213 can be implemented by an odometer. When the passenger is carried, the meter apparatus 213 is activated manually and/or via a computer system, and transmit an activating message via the first wireless transmitting apparatus 211. Preferably, the meter apparatus 213 can further attach a printing apparatus, such as a receipt printer, for printing invoice.

The vehicle controlling server 22 comprises a geographic information database apparatus 221, an operating interface platform 222, a second wireless transmitting apparatus 223. Besides, the vehicle controlling server 22 can further comprise a credit payment module and an evaluation module 225 if necessary.

The vehicle controlling server 22 is used to receive and calculate the current coordinates of the vehicles for obtaining the messages of the longitude, the latitude, the speed, and the moving direction.

The geographic information database apparatus 221 receives and stores the current coordinates of the vehicles transmitted from the vehicle controlling server 22, and stores a plurality of road information composed of the road directions, the road geometry, and the traffic loading condition.

The operating interface platform 222 allows the user to connect to the operating interface platform 222 for inputting a calling request via a network apparatus 23. Preferably, the operating interface platform 222 can be an internet geographic information platform, and the network apparatus 23 can be a personal computer, a personal digital assist device (PDA), or a hand communication device, which can connect to the operating interface platform 222 by means of GSM/GPRS, 3 G, 3.5 G, WiFi, and WiMax. The operating interface platform 222 can receive the calling request, and the activating message transmitted from the meter apparatus 213.

Preferably, the operating interface platform 222 can further provide a search function that allows the user to select a dispatch vehicle with the criteria of a previously taken vehicle, the punctuality, or an evaluation value exceeding the threshold. The calling request contains the messages with respect to a specified vehicle, a specified pick-up time, a specified originated coordinate, and a specified destined coordinate.

Preferably, the operating apparatus 222 can further comprise a vehicle position display interface 226 to display the vehicle information of the structure information, the manufacturing date, the serial number, and the traffic violation, and to display the operation status of the vehicle such as rest, dispatched, or empty based on the activating message.

The operating interface platform 222 can calculate an estimated value based on the current coordinates of the vehicles, the road information, the calling request, and the activating message of the meter apparatus 213, and select a specified vehicle base on the estimate value.

The second wireless transmitting apparatus 223 can transmit a specified request to the specified vehicle based on the selection of the operating interface platform 222. Preferably, the second wireless transmitting apparatus 223 can be a communication device using the GSM/GPRS, 3 G, 3.5 G, WiFi, and WiMax communication technology.

The user can input a prepaid message and send the prepaid message to the prepaid module 224 via the network apparatus 23. Preferably, the prepaid message can be the identification number of an IC card, part of the credit card number, or other payment information.

The evaluation module 225 predetermines a range of the evaluation value, for example a score value ranged form 0 to 100, and provides evaluation means for the user to assess a dispatch service, and display an evaluation result of a dispatch service to the vehicle position display interface 226. Therefore, the user can consult the vehicle condition, the operation status of the vehicle, and the result of evaluation before inputting the calling request. The objective of evaluation module is to prevent the user from riding a dispatch vehicle at bad service quality so as to ensure the right for passengers.

Preferably, the vehicle loading module 21 further comprises an operating apparatus 214 to allow by the driver to input a decide request responding to the specified request which is transmitted from the second wireless transmitting apparatus 223 and received by the first wireless transmitting apparatus 211. The specified request can be an accept request or a reject request.

Figure 2:
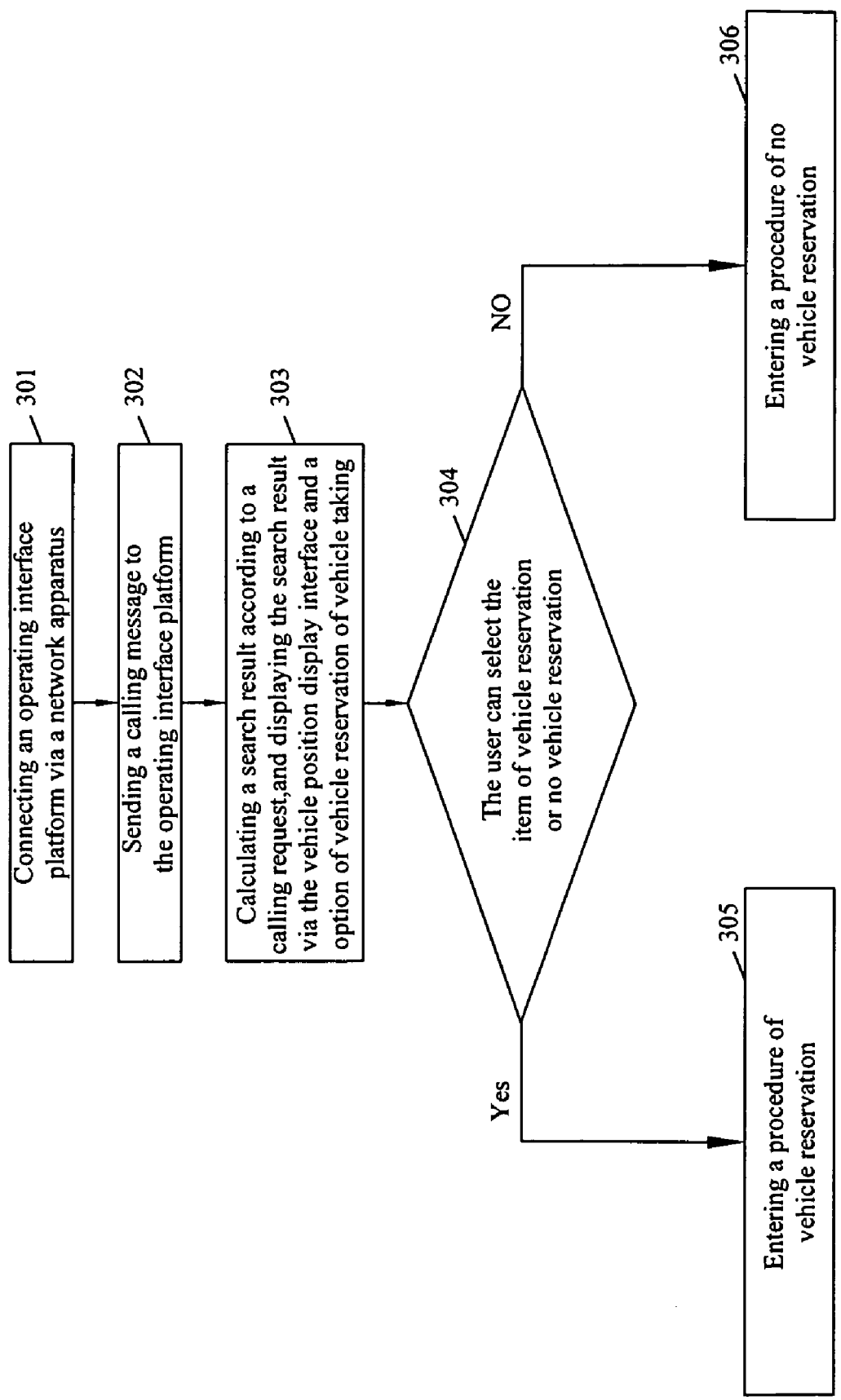
FIG. 2 illustrates a flowchart of using a vehicle dispatch system of the present invention with the vehicle reservation or no vehicle reservation.
Figure 3:
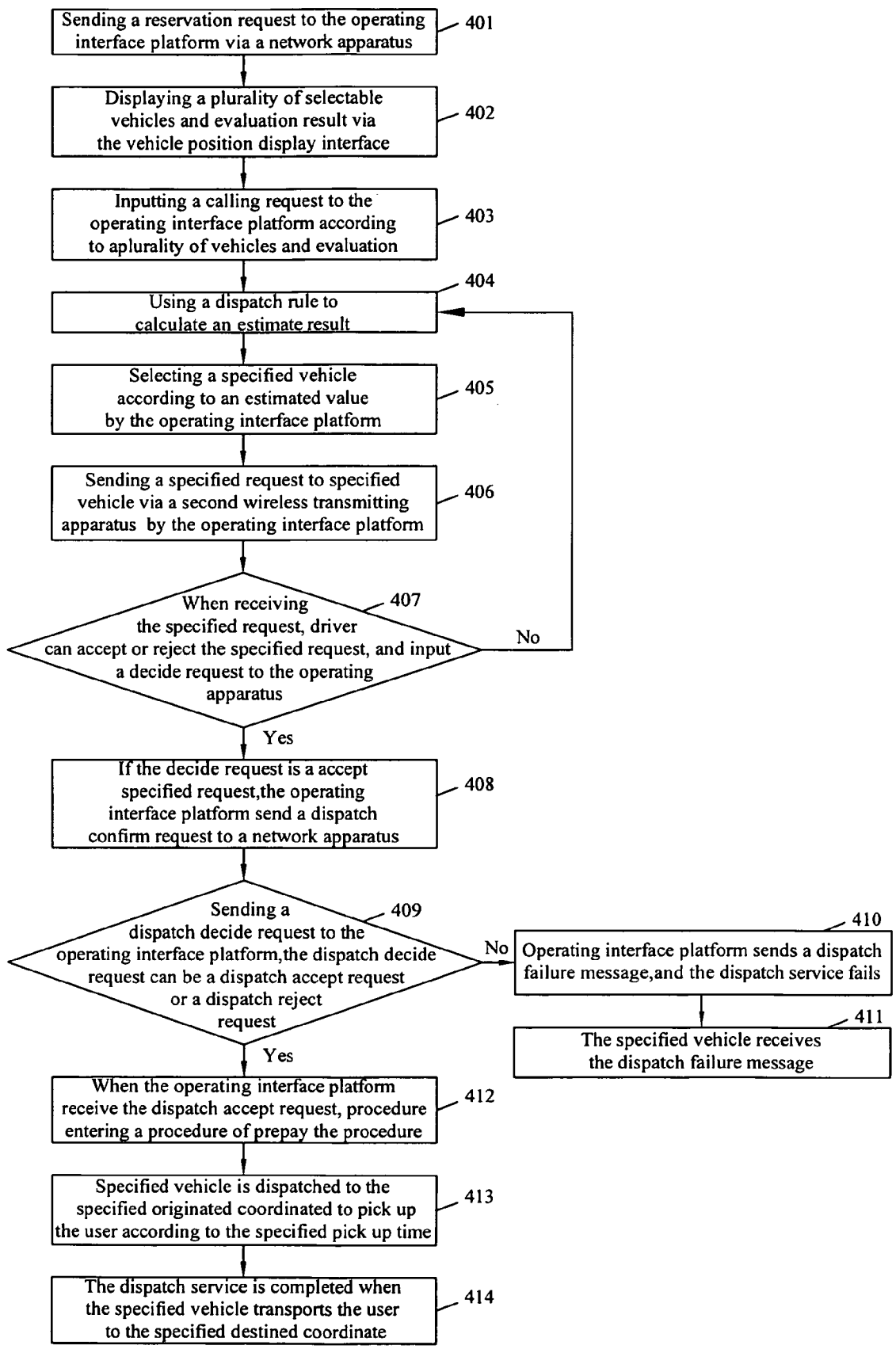
FIG. 3 illustrates a flowchart of procedure of vehicle reservation and prepaid service in the vehicle dispatch system of the present invention.

FIG. 2 illustrates a flowchart of using a vehicle dispatch system of the present invention with the vehicle reservation or no vehicle reservation. The flowchart is corresponding to the vehicle dispatch system shown in FIG. 1 and comprises the following steps:

step (301): user can use the network apparatus 23 to connect to the operating interface platform 222 when the user plans to take a vehicle;

step (302): the user can send the calling request to the operating interface platform 222 via the network apparatus 23 when the network apparatus 23 connects to the operating interface platform 222;

step (303): the operating interface platform 222 calculates a search result based on the calling request after receiving the calling message, and displays the search result and a select option of vehicle reservation via the vehicle position display interface 226;

step (304): the user can select the item of vehicle reservation or no vehicle reservation;

step (305): the user enters a procedure of vehicle reservation if the user selects the item of vehicle reservation;

step (306): the user enters a procedure of no vehicle reservation if the user selects the item of no vehicle reservation;

The FIG. 3 illustrates a flowchart of procedure of vehicle reservation and prepaid service in the vehicle dispatch system of the present invention. The flowchart comprises the following steps:

Step (401): the user sends a reservation request to the operating interface platform 222 via the network apparatus 23;

step (402): the vehicle position display interface 226 displays a plurality of selectable vehicles and the evaluation result for user reference after the operating interface platform 222 receives the reservation request;

step (403): the user inputs the calling request to the operating interface platform 222 based on the vehicles and the evaluation result;

step (404): the operating interface platform 222 uses a dispatch rule to calculate an estimated value based on the activating message of the vehicles, the current coordinates of the vehicles, the road information, and the calling request;

step (405): the operating interface platform 222 selects a specified vehicle based on the estimated value;

step (406): the operating interface platform 222 sends a specified request to the specified vehicle via the second wireless transmitting apparatus 223;

step (407): the operating apparatus 214 of the vehicle loading module 21 receives the specified request sent from second wireless transmitting apparatus 223. After receiving the specified request, the driver can accept or reject the specified request, and input a decide request to the operating apparatus, and the decide request is sent to the operating interface platform 222;

step (408): after receiving the specified request, the operating interface platform 222 recalculates an estimated value based on the dispatch rule if the decide request is a reject request; otherwise, the operating interface platform 222 sends a dispatch confirmation request to the network apparatus 23 if the dispatch request is an accept request;

step (409): after receiving the dispatch decide request via the network apparatus 23, the user can send a dispatch decide request to the operating interface platform 222, and the dispatch decide request can be a dispatch accept request or a dispatch reject request.

step (410): the operating interface platform 222 sends a dispatch failure message if the dispatch decide request is a dispatch reject request, and the dispatch service fails;

step (411): the specified vehicle receives the dispatch failure message and the dispatch is aborted;

step (412): the user enter a prepaid procedure when the dispatch decide request is a dispatch accept request;

step (413): the operating interface platform 222 sends a dispatch confirm message to the specified vehicle if the prepaid procedure is completed, and the specified vehicle is dispatched to the specified originated coordinate to pick up the user based on the specified pick-up time;

step (414): the dispatch service is completed when the specified vehicle transports the user to the specified destined coordinate.

When the user chooses to prepay, the operating interface platform 222 will calculate the passenger fare only based on the specified originated coordinate and the specified destined coordinate, which will not consider the delays due to the traffic jams or traffic light, so the passenger fare is cheaper, on the other hands, the right of the driver is thus ensured since the fare is prepaid by user.

Figure 4:
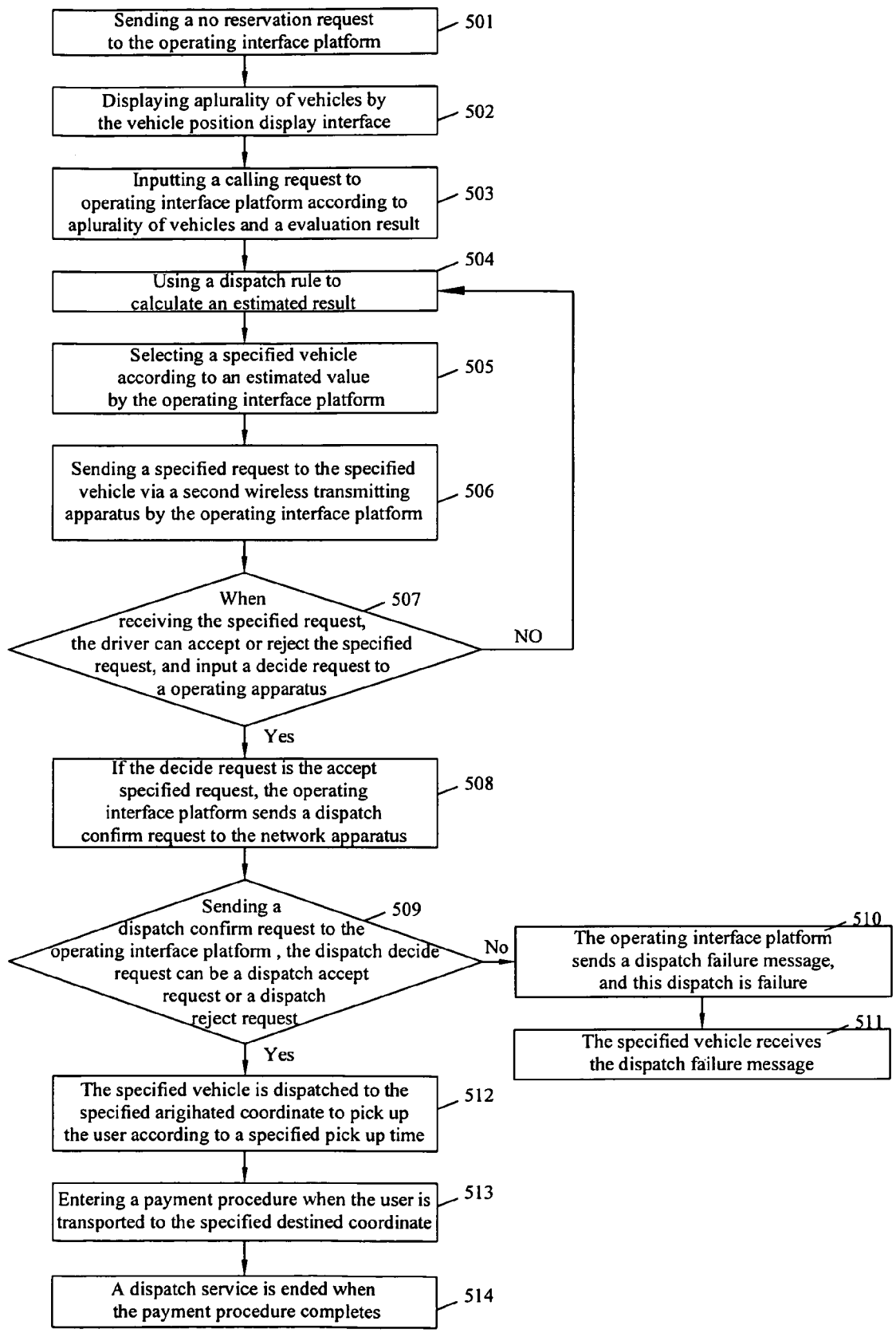
FIG. 4 illustrates a flowchart of procedure of no vehicle reservation in the vehicle dispatch system of the present invention.

The FIG. 4 illustrates a flowchart of procedure of no vehicle reservation in the vehicle dispatch system of the present invention. The flowchart comprises the following steps:

Step (501): the user sends a no vehicle reservation request to the operating interface platform 222 when entering the procedure of no vehicle reservation;

step (502): the vehicle position display interface 226 displays a plurality of selectable vehicles to provide the user as reference when the operating interface platform 222 receive the no vehicle reservation request;

step (503): the user inputs the calling request to the operating interface platform 222 based on the selectable vehicles;

step (504): the operating interface platform 222 uses a dispatch rule to calculate an estimated value based on the activating message of the vehicles, the current coordinates of the vehicles, the road information and the calling request;

step (505): the operating interface platform 222 selects a specified vehicle based on the estimate value;

step (506): the operating interface platform 222 sends a specified request to the specified vehicle via the second wireless transmitting apparatus 223;

step (507): the operating apparatus 214 of the vehicle loading module 21 can use the first wireless transmitting apparatus 211 to receive the specified request transmitted by the second wireless transmitting apparatus 223, and driver can accept or reject the specified request, and then input a decide request to the operating apparatus and then the decide request is transmitted to the operating interface platform 222 via the first wireless transmitting apparatus 211;

step (508): if the decide request is a specified reject request, the operating interface platform 222 recalculates an estimated value based on the dispatch rule, otherwise, if the decide request is the specified accept request, and the operating interface platform 222 sends a dispatch confirmation request to the network apparatus 23;

step (509): the use can input a dispatch decide request to the operating interface platform 222 when receiving the dispatch confirmation request via the network apparatus 23, in which the dispatch decide request can be a dispatch accept request or a dispatch reject request;

step (510): the operating interface platform 222 sends a dispatch failure message when the dispatch decide request is a dispatch reject request, and the dispatch service fails;

step (511): the dispatch is aborted when the specified vehicle receives the dispatch failure message;

step (512): the operating interface platform 222 sends a dispatch confirm message to the specified vehicle when the dispatch decide request is a dispatch accept request, and the specified vehicle is dispatched to pick up the user at the specified originated coordinate based on the specified pick-up time;

step (513): a payment procedure is applied when the user is transported to the specified destined coordinate;

step (514): a dispatch service is ended when the payment procedure completes.

If the user do not choose to prepay, the number of selectable vehicles displayed by vehicle position display interface 226 in the no prepaid procedure (step 502) is less than the number in prepaid procedure (step 402). For example, the vehicle position display interface 226 can only display the vehicles which can arrive the specified originated location in less than five minutes, and if the user choose not to prepay, the guarantee of successful dispatch can not be ensured by the vehicle dispatch system 2, so as to prevent the specified vehicle from losing of time and money while the dispatch service is cancelled right after the specified vehicle is dispatched.

Figure 5:
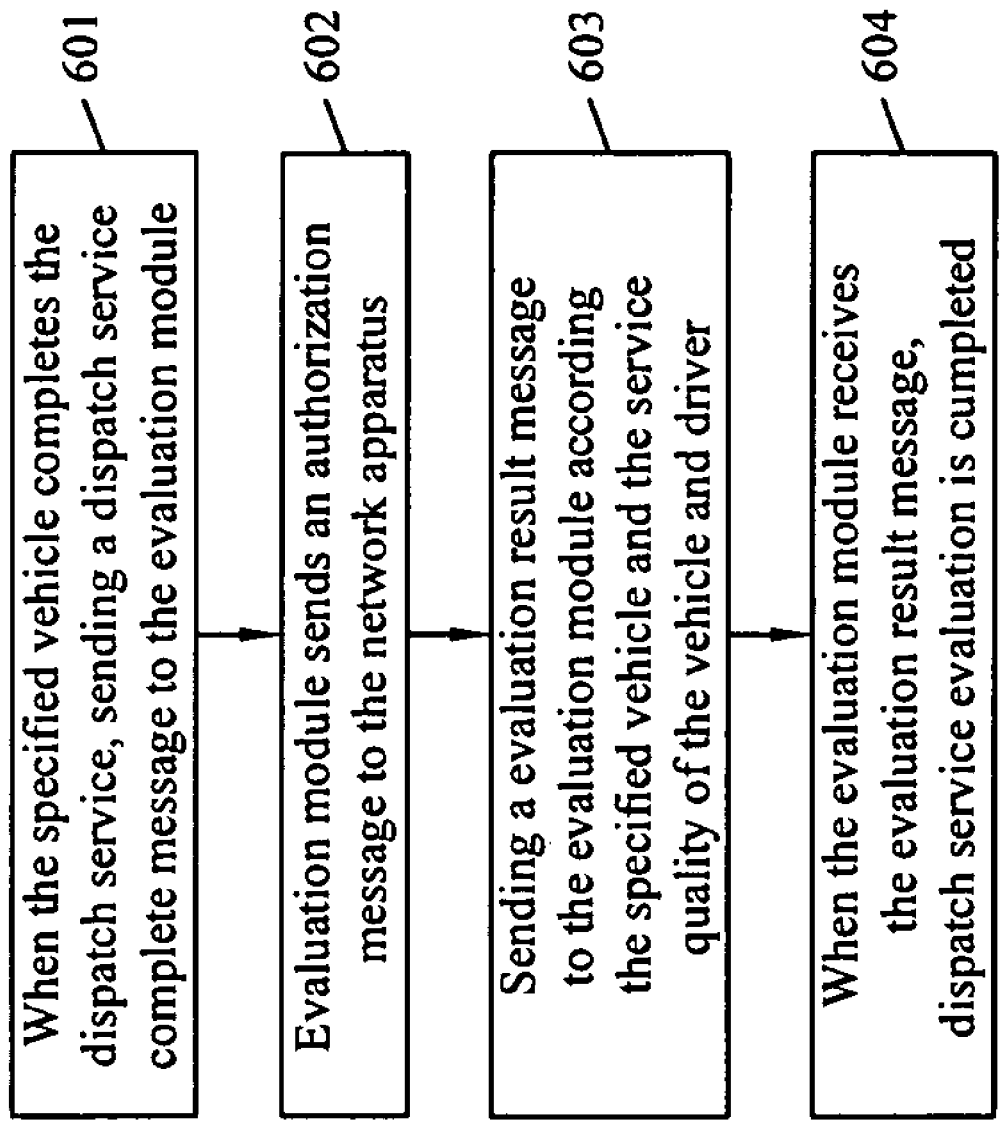
FIG. 5 is a flowchart of one embodiment of an evaluation mechanism of the present invention.

The FIG. 5 illustrates a procedure of dispatch service evaluation of the present invention, and the procedure comprises the following steps:

step (601): a dispatch service complete message is sent to the operating interface platform 222 when the specified vehicle completes the dispatch service;

step (602): the evaluation module 225 of the operating interface platform 222 sends an evaluating authorization message to the network apparatus 23 when the operating interface platform 222 receives the dispatch service complete message;

step (603): the user can use the network apparatus to connect to evaluation module 225 of the operating interface platform 222 when receiving the evaluating authorization message, and send an evaluation result message based on the service quality of the dispatch vehicle and the driver to evaluation module 225 of the operating interface platform 222;

step (604): the dispatch service evaluation is completed when the evaluation module 225 receives the evaluation result message.

Figure 6:
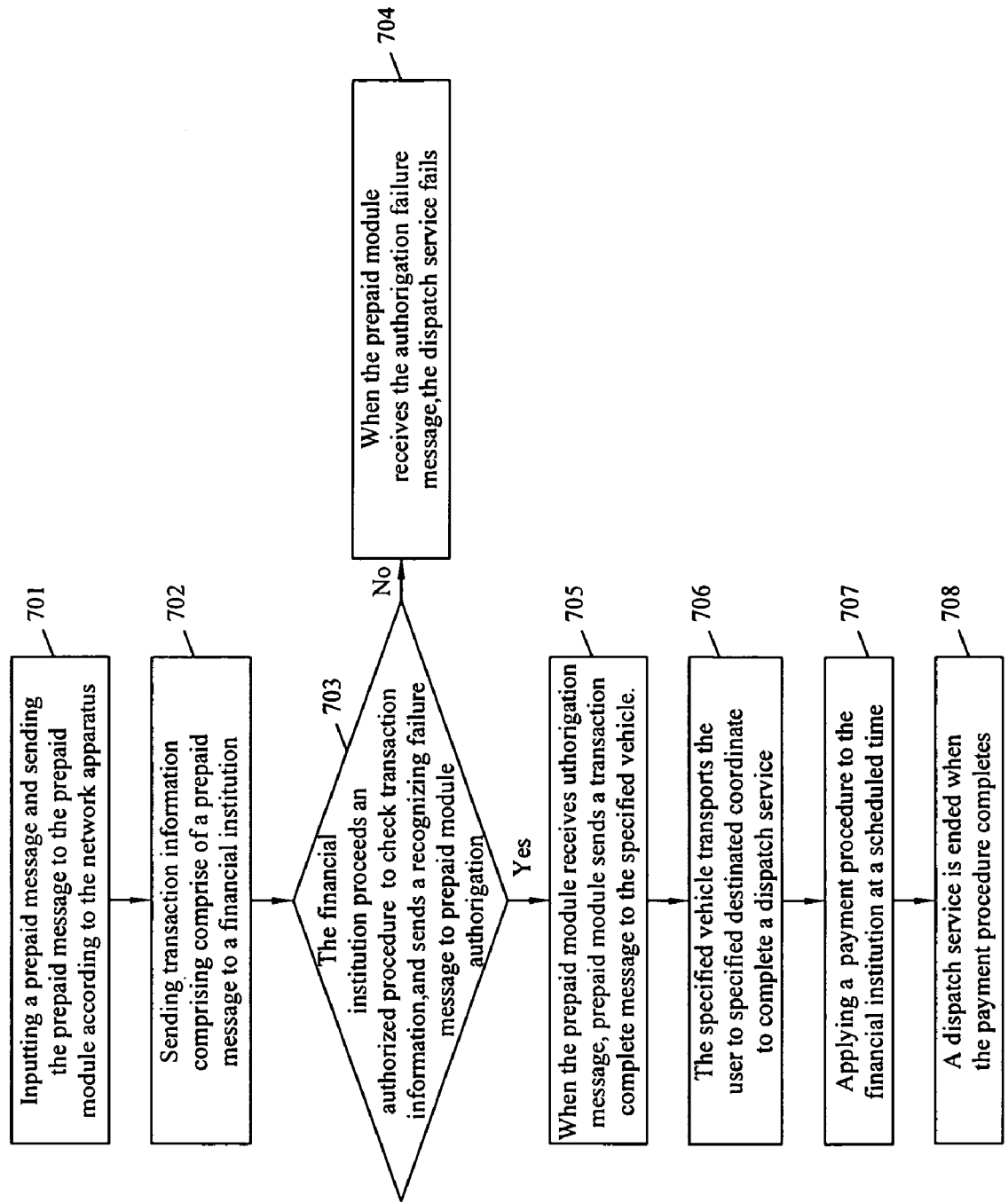
FIG. 6 is a flowchart of one embodiment of a prepaid procedure of the present invention.

The FIG. 6 illustrates a flowchart of procedure of a prepaid service of the present invention. The procedure comprises the following steps:

step (701): the user uses the network apparatus 23 to input a prepaid message and send the prepaid message to prepaid module 224;

step (702): the prepaid module 224 sends a transaction information comprising a prepaid message to a financial institution when receiving the prepaid message;

step (703): the financial institution proceeds an authorization procedure to verify the transaction information after receiving the transaction information, and sends a recognized failure message or a recognized success message to the prepaid module 224;

step (704): the prepaid module 224 receives the authorization failure message if the transaction information does not pass the authorization procedure, the dispatch service fails;

step (705): the prepaid module 224 receives the authorization successful message if the transaction information passes the authorization procedure, and the prepaid module 224 then sends a transaction complete message to the specified vehicle;

step (706): the printing apparatus of the specified vehicle prints a receipt based on the transaction complete message, and the specified vehicle picks up the user and transports the user to the specified destined coordinate to complete a dispatch service;

step (707): the dispatch company applies a payment procedure to the financial institution at scheduled time;

step (708): a dispatch service is ended when dispatch service completes.

As disclosed therein, vehicle dispatch system of the present invention can allow the user to obtain the vehicle information before subscribing the vehicle service, not ride the vehicle with bad service quality, and also to provide the user with the prepaid function, hence the fare is cheaper and the right of the driver is ensured as well, through an evaluation mechanism, by which to ensure the user from vehicles with bad service quality, the inventive objective is thus achieved.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A vehicle dispatch system, comprising a plurality of vehicle loading modules and a vehicle controlling server, and
said vehicle loading modules, respectively installed in a plurality of vehicles, and comprising:
a first wireless transmitting apparatus;
a global positioning receiver, for providing the current coordinates of said vehicles and transmitting said coordinates through said first wireless transmitting apparatus; and
a meter apparatus, being activated when said vehicles transporting passengers, and said meter apparatus transmitting an activating message via said first wireless transmitting apparatus;
said vehicle controlling server comprising:
a geographic information database apparatus, for receiving and storing current coordinates of said vehicles and a plurality of road information;
an operating interface platform, for providing a user with a network apparatus to connect to said operating interface platform for inputting a calling request, and said operating interface platform receiving said calling request and said activating message, and selecting a specified vehicle based on current coordinates of said vehicles, said road information, and said activating message; and
a second wireless transmitting apparatus, for sending a specified request to said specified vehicle;
wherein said operating interface platform further comprises a vehicle position display interface for displaying vehicle structure information, manufacturing date, serial number, traffic violation information, and operation status of said vehicles based on said activating message.

2. The vehicle dispatch system of claim 1, wherein said network apparatus is a personal computer, a personal digital assist device, or a hand communication device.

3. The vehicle dispatch system of claim 1, wherein said network apparatus connects to said operating interface platform by means of a wired or wireless connection.

4. The vehicle dispatch system of claim 1, wherein said user can search and select said specified vehicle based on the condition and operation status of said vehicles.

5. The vehicle dispatch system of claim 1, wherein said operating interface platform further comprises a prepaid module for said user to input a prepaid message via said network apparatus and send said prepaid message to said prepaid module for prepaying a carfare.

6. The vehicle dispatch system of claim 1, wherein said vehicle loading modules further comprises an operating apparatus for operating said first wireless transmitting apparatus to receive said specified request transmitted by said second wireless transmitting apparatus, and allowing drivers of said vehicles to input a decide request responding to said specified request.

7. The vehicle dispatch system of claim 1, wherein said operating interface platform further comprises an evaluation module for said user to evaluate a dispatch service.

8. The vehicle dispatch system of claim 7, wherein said evaluation module predetermines an evaluation value ranged from 0 to 100, and provides said user with an click-and-point means to evaluate.

9. The vehicle dispatch system of claim 7, wherein a dispatch service complete message is sent to said evaluation module when said dispatch service is completed by said specified vehicle, and said evaluation module sends an evaluation authorization message to said network apparatus based on said dispatch service complete message, and said user sends an evaluation result message to said evaluation module so as to complete the evaluating of said dispatch service.

* * * * *